United States Patent [19]

Curran et al.

[11] 3,770,885

[45] Nov. 6, 1973

[54] COLOR ELECTRONIC PERISCOPE VIEW SIMULATOR

[75] Inventors: William J. Curran, Fern Park; John J. Kulik, Winter Park, both of Fla.

[73] Assignee: The United States of America as represented by the Secretary of the Navy, Washington, D.C.

[22] Filed: Oct. 21, 1971

[21] Appl. No.: 191,279

[52] U.S. Cl. .............. 178/6, 178/5.2 R, 178/DIG. 6
[51] Int. Cl. .......................... H04n 7/18, H04n 9/04
[58] Field of Search .................... 178/DIG. 6, 5, 2 R

[56] References Cited

UNITED STATES PATENTS 3,595,987 7/1971 Vlahos .......................... 178/DIG. 6
3,588,322 6/1971 Bartel .......................... 178/DIG. 6

*Primary Examiner*—Howard W. Britton
*Attorney*—Richard S. Sciascia et al.

[57] ABSTRACT

In a closed circuit television display portraying models maneuvering against a background, a colored scene is provided for the background from an electronic video recorder (EVR). Images of ships, planes, etc. inserted into the background are derived from the video signals of black and white cameras and are colored electronically.

2 Claims, 4 Drawing Figures

PATENTED NOV 6 1973 3,770,885

SHEET 1 OF 2

PATENTED NOV 6 1973 3,770,885

SHEET 2 OF 2

COLOR ELECTRONIC PERISCOPE VIEW SIMULATOR

BACKGROUND OF THE INVENTION

The invention is in the field of television systems, particularly closed circuit television systems employed in training devices. In a periscope view simulator training device used to train submarine operating personnel, trainees view a television display representing a view of the surface of the sea through an operative periscope. The sea view is synthesized from the video signal output of a TV camera which is trained on a background scene, e.g., a picture, and from a plurality of TV cameras which respectively view different objects such as models of ships, planes, etc. Efforts to build a periscope view simulator having a television display in color have heretofore been frustrated by the high cost and great complexity of color television cameras and associated apparatus. The invention achieves a full color television display using black and white rather than color cameras and an electronic video recorder.

SUMMARY OF THE INVENTION

A closed circuit television system uses an electronic video recorder to provide background video for a display. A plurality of foreground images are derived from video information furnished by a plurality of black and white cameras. The foreground images are colored electronically by color information added to the video output of the black and white cameras.

DESCRIPTION OF THE PREFERRED EMBODIMENT

Figure 1:
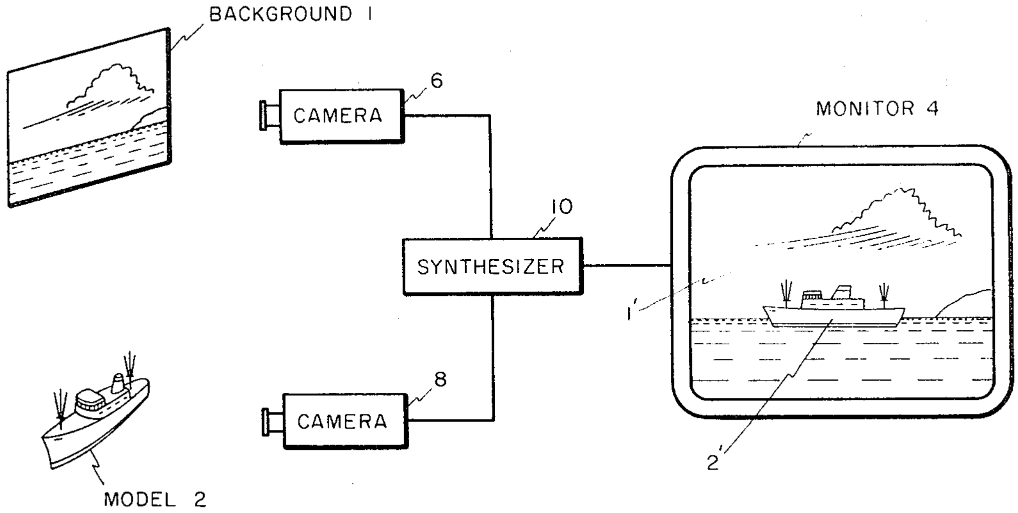
FIG. 1 shows prior art.

FIG. 1 shows a prior art training device of a type suited for use with the invention. The training device includes a closed circuit television system including a background picture or equivalent 1 which is observed by a television camera 6. A model such as a model of a ship 2 is observed by a television camera 8. The video output signals from cameras 6 and 8 are combined in a synthesizer 10 to form a picture on a television monitor-display 4. The picture on 4 is comprised of a background scene 1[1] (derived from 1) and a foreground scene comprising a ship 2[1] (derived from 2). U.S. Pat. Nos. 3,479,454 and 3,420,953 to Hanns H. Wolff disclose the training device of FIG. 1. Means are taught in the aforementioned patents to cause ship image 2[1] to maneuver on background scene 1[1] in response to manipulation of controls at a student-periscope station and at an instructor's station. Synthesizer 10 is essentially an improved montage amplifier for inserting one or more foreground images in a background image on monitor 4 and having means for electronically maneuvering the foreground images.

Figure 2:
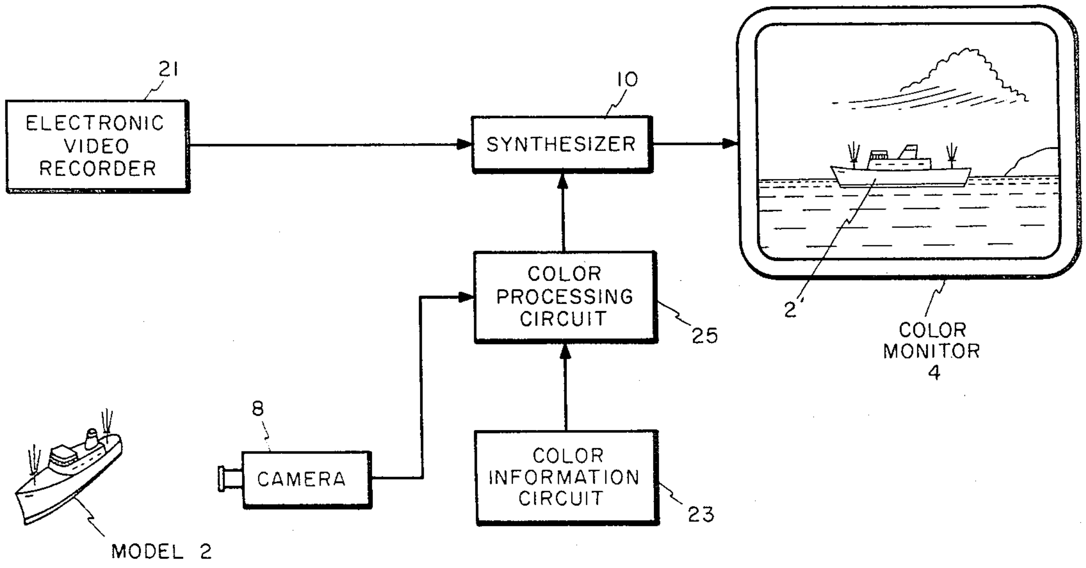
FIG. 2 is a block diagram of the invention.

Applicants' invention is shown in FIG. 2. The arrangement is similar in organization to the prior art device of FIG. 1, in that backround and foreground video information signals are combined in a television display on monitor 4. The foreground video information is derived from a black and white television camera 8 which observes a model 2 in the same manner as the device of FIG. 1. However, the background information is read out of storage in an electronic video recorder 21. The video information from camera 8 is combined with information from a color information circuit 23 in color processing circuit 25. Video information from 21 and 25 is combined in synthesizer 10, then forwarded to color monitor 4 where it is displayed as a composite color picture comprising foreground and background scenes as shown in FIG. 1.

The video information stored in recorder 21 is in color. The black and white video from camera 8 is converted to color video in color processing circuit 25. Thus a full color picture can be shown on monitor 4 without using color cameras. This results in a greatly improved and more effective display without incurring the expense and complexity of color cameras.

The invention takes advantage of the fact that, for many purposes, a foreground scene in a single color is completely satisfactory. For example, in a typical training device such as disclosed in the aforementioned patents, ships, planes, submarines, etc. in the foreground of a televised scene may be of a single color. Warships are usually painted a dull gray. Black or a rusty red color is typical of the average freight ship or tanker.

Thus applicants' television display comprising a full color background scene such as a seascape with ships of a single color in the foreground is quite life-like and a tremendous improvement over the black and white displays of the prior art.

Figure 3:
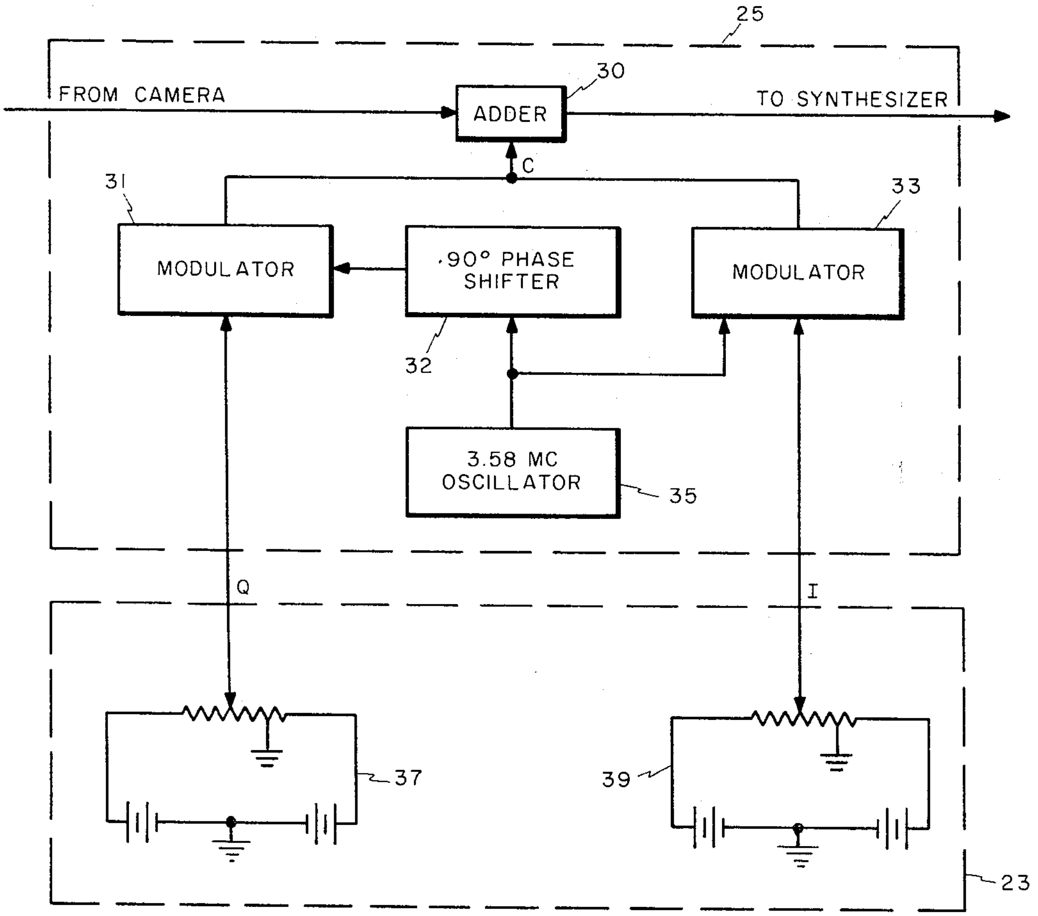
FIG. 3 shows details of the invention.

Details of the invention are shown in FIG. 3. Here the black and white television camera 8 is seen to furnish a luminance signal Y to an adder 30. A chrominance signal C is added to signal Y in adder 30 and the sum signal is forwarded to synthesizer 10 where it is combined with a signal from video recorder 21 as shown in FIG. 2. Chrominance signal C is derived from two modulators 31 and 33 which modulate a 3.58 MC frequency from an oscillator 35 with two respective color signals Q and I which are derived from two respective potentiometers 37 and 39. The signal from oscillator 35 is phase shifted 90° in a phase shifting circuit 32 before it is furnished to modulator 31.

Potentiometers 37 and 39 comprise the color information circuit 23 of FIG. 2. Adder 30, modulators 31 and 33, phase shifting circuit 32 and oscillator 35 comprise the color processing circuit 25 of FIG. 2.

Figure 4:
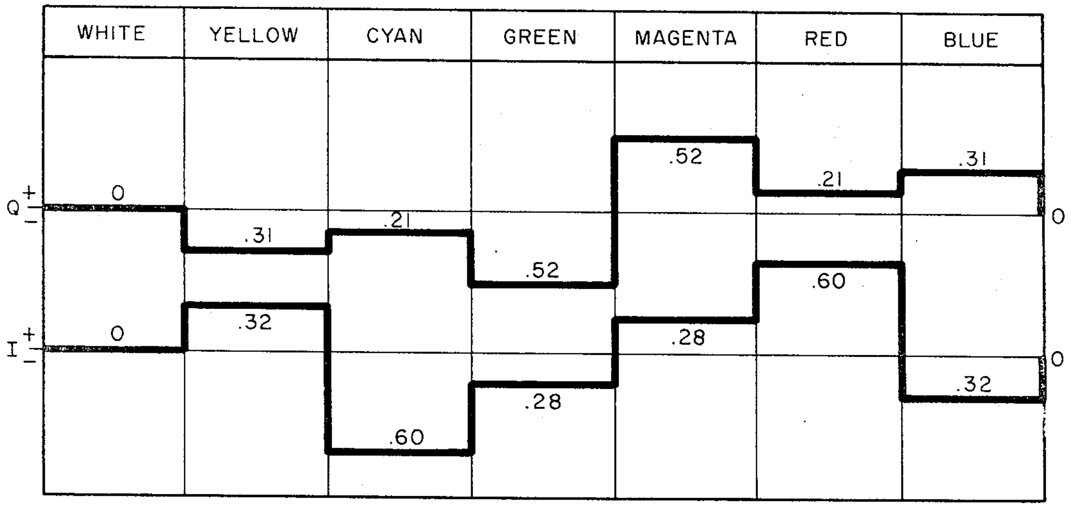
FIG. 4 shows voltages applied by the invention to color foreground images.

Potentiometers 37 and 39 may be adjusted to vary the magnitudes and polarity of the signals Q and I supplied to modulators 31 and 33. The magnitudes and polarities of Q and I determine the value of the color signal C which in turn determines the color of the foreground image 2[1] on color monitor 4[1] in FIG. 2. The magnitudes and polarities of signals Q and I required to color the foreground image various colors, is shown in FIG. 4. Model 2 may be colored and finished naturally in order that luminance signal Y will not be adversely affected by incorrect reflectivity or other values.

When the background scene is in color and the foreground scene is in color the realism of the display, and hence the effectiveness of the training device, is greatly enhanced. The background scene can be dynamic. The invention can be used to color the background scene also if the background video originates from a black and white camera as illustrated in FIG. 1. The invention can be applied to the background and/or foreground video regardless of the source in order to create various special effects, for example to tinge or shade the entire picture with some color, etc.

What is claimed is:

1. In a training device wherein a televised composite picture comprising a background image and a foreground image is displayed on a television monitor, the improvement comprising background video means for producing a background video signal, foreground video means for producing a black and white foreground video signal, synthesizer means for combining said background video signal and said foreground video signal to produce a combined video signal, means for applying said combined video signal to said television monitor to produce said composite picture, coloring means for modifying said foreground video signal to change said foreground image from black and white to color, said coloring means comprising a color processing circuit and a color information circuit, and means connecting said foreground video means to said color processing circuit for supplying said foreground video signal to said color processing circuit, said color processing circuit being responsive to said color information circuit to modify said foreground video signal, said color information circuit comprising a first variable voltage generator for generating a first color signal Q of selected magnitude and polarity and a second variable voltage generator for generating a second color signal I of selected magnitude and polarity.

2. The apparatus of claim 1, said color processing circuit comprising:

an oscillator, a phase shifter for shifting the output frequency of said oscillator, a first modulator connected to modulate the phase shifted output frequency of said oscillator with the color signal Q, a second modulator connected to modulate the output frequency of said oscillator with said color signal I, means for combining the output signals from said modulators to obtain a chrominance signal C, and an adder circuit for adding said chrominance signal C to said foreground video signal.

* * * * *